(No Model.)
A. SMITH.
BELT FASTENER.
No. 453,515. Patented June 2, 1891.
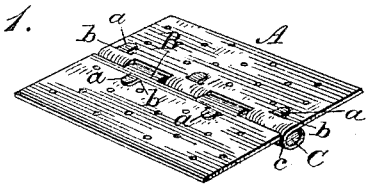
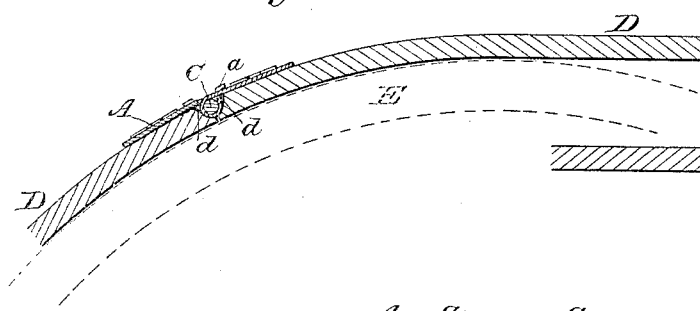
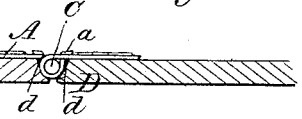
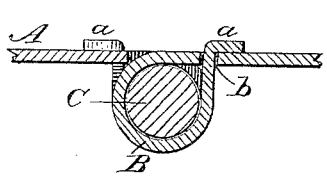
WITNESSES:
INVENTOR:

UNITED STATES PATENT OFFICE.

ARTHUR SMITH, OF POUGHKEEPSIE, NEW YORK.

BELT-FASTENER.

SPECIFICATION forming part of Letters Patent No. 453,515, dated June 2, 1891.

Application filed February 20, 1891. Serial No. 382,220. (No model.)

*To all whom it may concern:*

Be it known that I, ARTHUR SMITH, a citizen of Great Britain, residing at Poughkeepsie, in the county of Dutchess and State of New York, have invented certain new and useful Improvements in Belt-Fasteners; and I do hereby declare the following to be a full, clear, and exact description of the invention, such as will enable others skilled in the art to which it appertains to make and use the same.

My invention relates to belt-fasteners; and it has for its object to provide a fastener which shall be simple and strong in construction, durable in use, and which may be easily applied and removed from the belt.

With these objects in view the invention consists in certain features of construction and combination of parts which will be hereinafter set forth.

In the drawings, Figure 1 is a perspective view of my belt-fastener, showing its form and construction before the belt is attached. Fig. 2 is a side elevation showing my device with the belt attached and in the position assumed in passing over a pulley. Fig. 3 is a similar view showing the fastener and attached belt in a horizontal position assumed running between the pulleys. Fig. 4 is an enlarged transverse section, better showing the construction of the hinge portion of my fastener; and Fig. 5 is a longitudinal section of the same, showing the pin inserted in the hinge-loops.

Similar letters refer to similar parts throughout the views.

The fastener consists of the plates A, provided with holes for the insertion of removable teeth or staples, and having slots *b* for the insertion of the integral lips *a* of the hinge-loops B. After insertion in the plate-slots *b*, the metal lips *a* are bent back against the upper surface of the plates A, and thus give the hinge-loops B a strength about eight times greater than the same thickness of metal would give in a hinge similarly formed without my strengthening device.

C is a rod or pintle for insertion in the alternate corresponding loops B of the hinge-plates A.

To facilitate the uncoupling of the hinge I avoid the necessity of riveting the rod C by forming loops on one plate just large enough to permit the rod to be driven friction tight into them, and by having the loops on the other plate slightly larger, so that they may work freely on the rod. This method of construction both prevents the displacement of the rod until it is required to drive it out for uncoupling the fastener and lessens the friction and consequent wearing of the hinge-loops.

Preferably the rod C works free in the outside loops and the others on the same plate, and is friction-tight in the loops of the opposite plate. To facilitate uncoupling the hinge when the belt is in working position, the rod C may be made a trifle smaller at one end, as is shown in Fig. 5. The belt D may be attached to my fastener, as is shown in Figs. 2 and 3, upon the under or pulley side of the plates A, by nails or staples driven through the perforations of the plates and clinched deeply in the under surface of the leather, so as not to present any friction of the metal upon the surface of the pulley.

As an additional safeguard against the contact of metal upon the pulley, I bevel the belt at *d*, adjacent to the hinge-loops B, so that in passing over the pulley, as shown in Fig. 2, the belt covers the hinge-loops entirely and presents a continuous leather-bearing surface upon the pulley.

It would be consistent with my invention to use plates made with permanent teeth for attaching the belts; but by the use of removable teeth, which I do not claim as new in themselves, I am enabled to use my improved hinge-fastener for many successive belts, as they in turn become worn out and in need of renewal.

Having thus described my invention, what I claim, and desire to secure by Letters Patent, is—

A belt-fastener comprising two members having pintle-bearings at their meeting edges, said bearings comprising tubular parts having the integral lips passed through perforations in the body of the members and bent back on each side of the articulation, a pintle inserted in such bearings and clamped rigidly in the bearings of one of the members, and means for securing said members to a belt, substantially as set forth.

In testimony whereof I affix my signature in presence of two witnesses.

ARTHUR SMITH.

Witnesses:
IRVING ELTING,
C. W. H. ARNOLD.